US006285555B1

(12) United States Patent
O'Neal et al.

(10) Patent No.: US 6,285,555 B1
(45) Date of Patent: Sep. 4, 2001

(54) APPARATUS AND METHOD FOR MOUNTING A PERIPHERAL DEVICE IN A COMPUTER SYSTEM

(75) Inventors: Sean P. O'Neal, Round Rock; Reynold Liao; Ron Langerhans, both of Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/291,150

(22) Filed: Apr. 13, 1999

(51) Int. Cl.$^7$ ................................. G06F 1/16; H05K 5/02
(52) U.S. Cl. ............................................ 361/727; 361/725
(58) Field of Search ..................................... 361/679, 683, 361/684, 685, 727, 728, 730, 724, 725

(56) References Cited

U.S. PATENT DOCUMENTS

| 4,941,841 | 7/1990 | Darden et al. |
| 5,136,446 | 8/1992 | Yamamoto et al. |
| 5,187,643 | 2/1993 | I-Shou |
| 5,229,919 | 7/1993 | Chen |
| 5,483,419 | * 1/1996 | Kaczeus, Sr. et al. ............... 361/685 |
| 5,572,402 | * 11/1996 | Jeong .................................... 361/685 |
| 5,675,761 | * 10/1997 | Paul et al. ............................. 395/404 |
| 5,682,291 | * 10/1997 | Jeffries et al. ....................... 361/1.85 |

* cited by examiner

Primary Examiner—Lynn D. Field
(74) Attorney, Agent, or Firm—Haynes and Boone, L.L.P.

(57) ABSTRACT

A computer system including an enclosure having a bay formed therein for receiving a peripheral device. A microprocessor is mounted in the enclosure, and an input is coupled to provide input to the microprocessor. A mass storage is coupled to the microprocessor, and a display is coupled to the microprocessor by a video controller. A system memory is coupled to provide storage to facilitate execution of computer programs by the microprocessor. A carrier is provided for removably mounting the peripheral device in the bay. The carrier includes a plurality of walls forming a cavity for receiving the peripheral device. The cavity has a first end and a second end. A first one of the walls has an opening formed therein. The opening has contoured edges adjacent the first and second ends of the cavity. A recessed portion is adjacent the opening in the first wall and the recessed portion extends at least partially between the first and second ends of the cavity.

12 Claims, 3 Drawing Sheets

APPARATUS AND METHOD FOR MOUNTING A PERIPHERAL DEVICE IN A COMPUTER SYSTEM

BACKGROUND

The disclosures herein relate generally to computer systems and more particularly to an apparatus and method for mounting a peripheral device in a computer system.

In a computer system with a modular design such as portable computer systems, peripheral devices such as digital video disc devices, mass storage devices and the like are required to be installed and removed. A problem can occur when an edge of the peripheral device or peripheral device carrier binds against the computer enclosure or chassis during installation and removal of the peripheral device. This results in excessive force to install and remove the peripheral device and precludes a smooth installation and extraction feel.

Conventional peripheral devices and the respective opening in the chassis of the computer system are generally rectangular in shape. This type of configuration requires that the chassis and the case of the peripheral device be manufactured to precise dimensions to obtain a precise alignment of the peripheral device relative to the chassis. However, slight deviations in the dimensions of the chassis or the case of the peripheral device may result in binding during installation and extraction of the peripheral device as the respective edges of the peripheral device moves relative to the chassis.

Several factors contribute to deviations in the dimensions of the case of peripheral devices and the chassis of the computer system. As with any manufacturing process, there are variations in the process parameters that will affect the dimensions of the resulting component. Changes in tooling during the production scale-up of the peripheral device or computer system may also affect the dimensions of the resulting component. Regardless of the reasons for the deviations, binding between the peripheral device and the chassis is not desirable.

Accordingly, a need has arisen for an apparatus and method that minimizes binding between a carrier for a peripheral device and the chassis or enclosure of the computer system during installation and removal to provide for smooth insertion and extraction of the peripheral device.

SUMMARY

One embodiment, accordingly, provides a self-aligning carrier for mounting a peripheral device in a computer system. To this end, one embodiment provides a carrier for removably mounting a peripheral device in a computer system. The carrier includes a plurality of walls that form a cavity for receiving the peripheral device. The cavity has a first end and a second end. A first one of the walls has an opening formed therein. The opening has a contoured first edge adjacent the first end of the cavity.

Several advantages are achieved by an apparatus according to embodiments presented herein having a reduced tendency to bind. The apparatus may be inserted into and removed from the chassis of the computer system without an undue amount of force. The apparatus has a self-alignment feature to prevent binding between the carrier and the chassis or enclosure. The self-alignment feature allows the apparatus to be inserted and removed with a smooth action.

BRIEF DESCRIPTION OF THE DRAWING FIGURES

DETAILED DESCRIPTION

Figure 1:
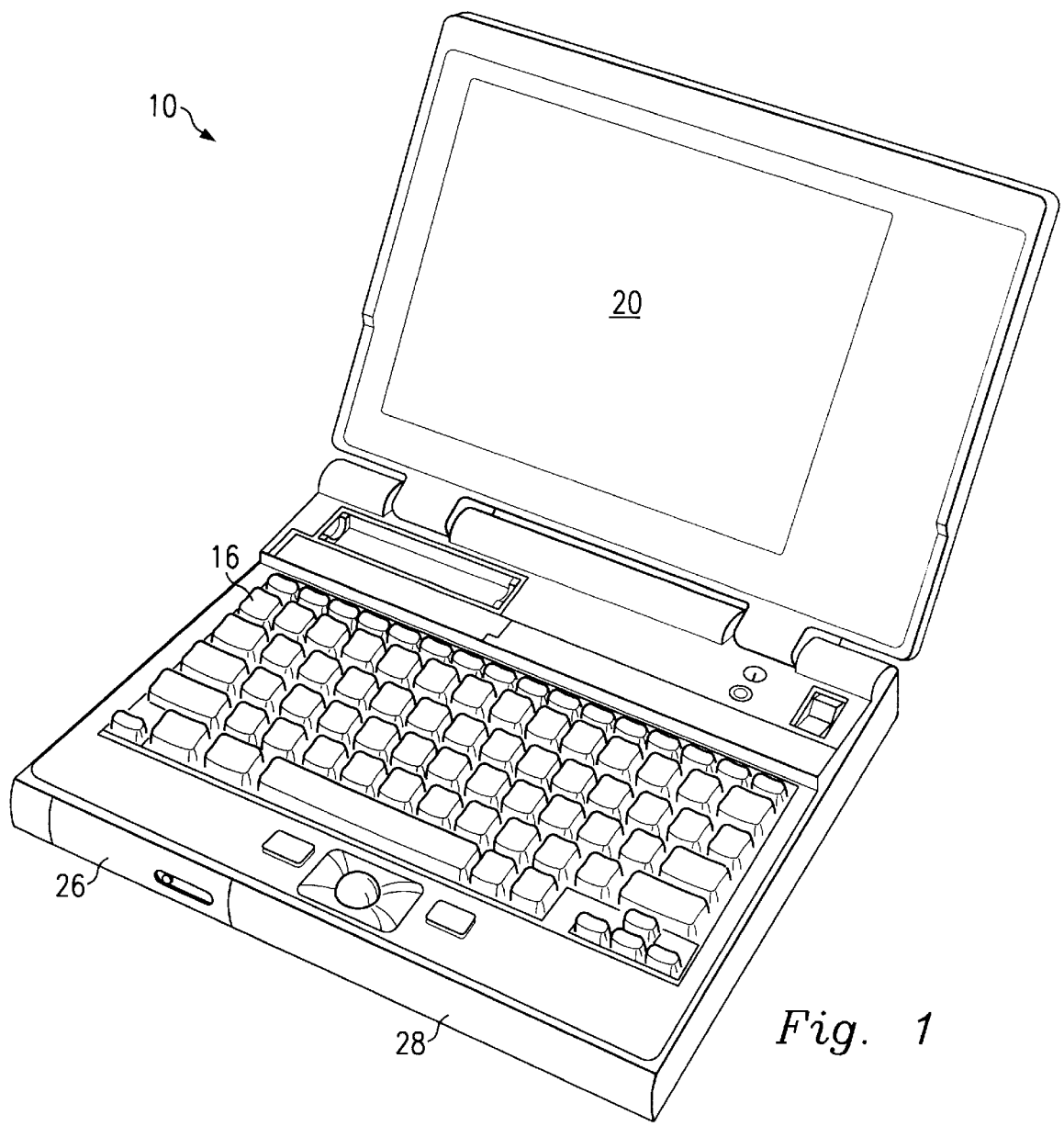
FIG. 1 is a perspective view illustrating an embodiment of a computer system.
Figure 2:
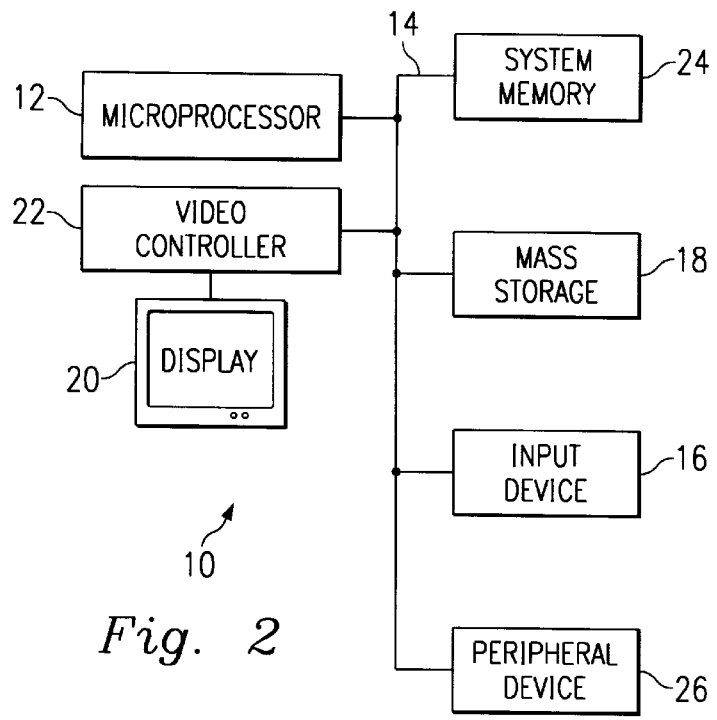
FIG. 2 is a block diagram illustrating an embodiment of a computer system.
Figure 3:
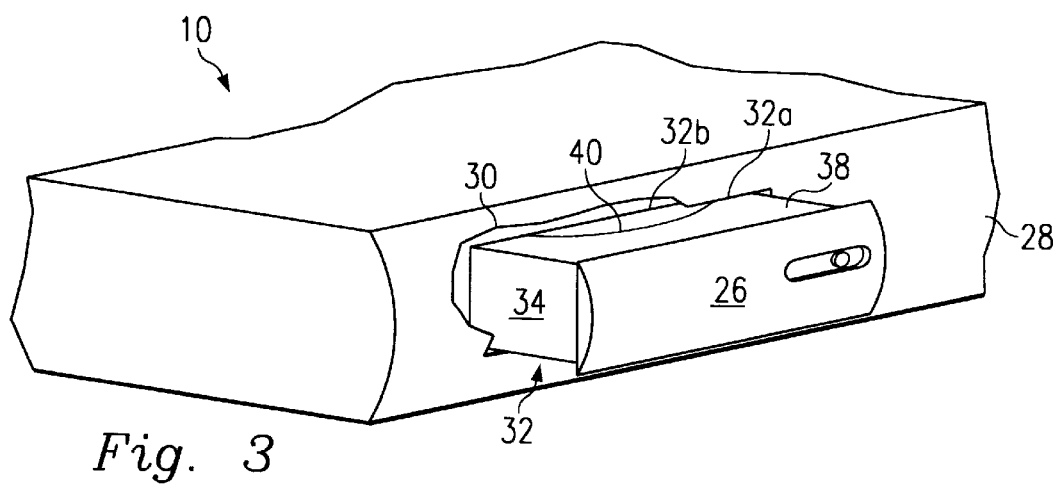
FIG. 3 is a fragmentary perspective view illustrating an embodiment of a peripheral device and carrier partially inserted into the bay of a computer system.
Figure 4:
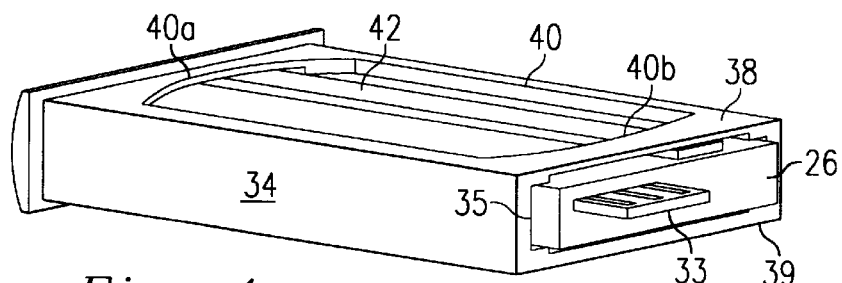
FIG. 4 is a perspective view illustrating an embodiment of a peripheral device and carrier according to the present disclosure.
Figure 5:
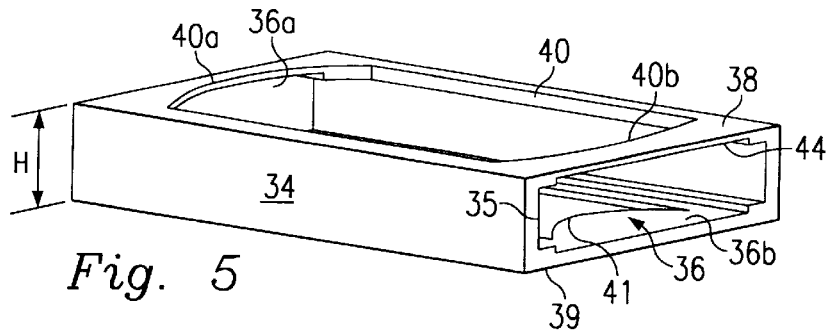
FIG. 5 is a perspective view illustrating an embodiment of a carrier according to the present disclosure.

FIGS. 1–3 illustrate an embodiment of a computer system 10, indicated generally at 10. The computer system 10 includes at least one microprocessor 12 The microprocessor 12 is connected to a bus 14. The bus 14 serves as a connection between the microprocessor 12 and other components of the computer system 10. An input device 16 is coupled to the microprocessor 12 to provide input to the microprocessor 12. Examples of input devices include keyboards, touchscreens, and pointing devices such as a mouse, a trackball and a trackpad. The computer system 10 further includes a display 20 which is coupled to the microprocessor 12 typically by a video controller 22. Programs and data are stored on a mass storage device 18 which is coupled to the microprocessor 12. Mass storage devices include components such as hard disks, optical disks, magneto-optical drives, floppy drives, and the like. The system memory 24 provides the microprocessor 12 with fast storage to facilitate execution of computer programs by the microprocessor 12. A peripheral device 26 for providing the computer system 10 with additional functionality may be connected to the microprocessor 12. Examples of peripheral devices include compact disc players, digital video disc players, memory card readers, and other types of ancillary devices. It should be understood that other busses and intermediate circuits can be employed between the components described above and microprocessor 12 to facilitate interconnection between the components and the microprocessor.

A non-portable computer system such as a desktop computer or server will typically include an enclosure 28 mounted on a chassis 30. The enclosure 28 is typically made from a polymeric material. The chassis 30 is typically made from a metallic material. Portable computer systems typically do not have a separate chassis and enclosure. In most portable computer systems, the enclosure 28 includes features for mounting the various components of the computer system. Chassis and enclosure design and construction techniques are well known.

As best illustrated in FIGS. 3–6, the computer system 10 includes a bay 32 for receiving the peripheral device 26 and the peripheral device 26 includes a carrier 34 for mounting the peripheral device 26 in the bay 32. In the case of a computer system without a chassis, the bay 32 includes an opening formed through the enclosure 28. In the case of a computer system with a chassis, the bay 32 would include an opening and another opening would also be formed through the chassis. The peripheral device 26 may be inserted and removed from the bay 32. The connector 33 extends through a passage 35 in a wall of the carrier 34 allowing the peripheral device 26 to be electrically interconnected to the respective components of the computer system 10.

The carrier 34 includes a plurality of walls defining a cavity 36 for receiving the peripheral device 26. The cavity 36 has a first end 36a and a second end 36b. A first wall 38 of the plurality of walls has an opening 40. In an alternate embodiment, a second wall 41 that is opposite the first wall may include a respective opening having a contoured edge adjacent either of the respective ends of the cavity 36. The opening 40 has a first edge 40a formed adjacent the first end 36a of the cavity 36 and a second edge 40b formed adjacent the second end 36b of the cavity 36. The first and second edges 40a, 40b are contoured. The peripheral device 26 includes a raised portion 42 that is received in a recessed portion 44 of the cavity. The recessed portion 44 of the cavity 36 is formed adjacent the opening 40 between the first and second ends 36a, 36b of the cavity 36. The raised portion 42 of the peripheral device 26 and the recessed portion 44 have respective height dimensions. The height dimension of the raised portion 42 is approximately the same as the height dimension of the recessed portion 44.

The necessity for the opening 40 stems from the desire to make the overall height H of the carrier 34 as small as possible and to form the carrier 34 from a polymeric material using an injection molding process. Without the opening 40, the thickness of the first wall would need to be maintained at a specified nominal thickness to reliably mold the first wall 38. For a given economical and feasible molding process, thinning the first wall 38 beyond this specified nominal thickness without providing opening 40 would often result in an unintentionally formed opening in the first wall 38 due to limitations in the ability to mold thin walls. By providing the opening 40, the thin sections of the first wall 38 may be minimized. Furthermore, the thinned sections are located at positions in the mold that are readily fillable during the molding process.

Figure 7:
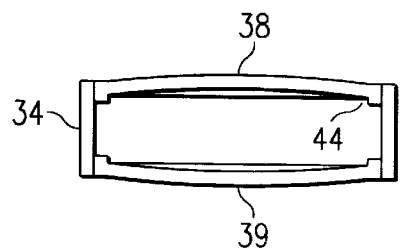
FIG. 7 is a sectional view taken at line 7—7 in FIG. 6.

The molding of thin walls is known to increase the potential for warpage. Specific to the carrier, warpage at the edges of the opening 40 as illustrated in FIG. 7 is possible. While not immediately detrimental to the structural integrity the carrier 34, warpage of the edges of the opening 40 may cause binding between the carrier 34 and the enclosure 28 or chassis 30. The potential for binding is highly probable when the edges of the opening 40 adjacent the first and second ends 36a, 36b of the cavity 36 and the adjacent edges 32a, 32b of the bay 32 are generally linear and parallel to each other. During insertion and extraction of carrier 34 into and from the bay 32, warpage at the edges of the opening 40 could result in the binding at the warped edges attempted to pass by the adjacent edges 32a, 32b of the bay 32.

Figure 6:
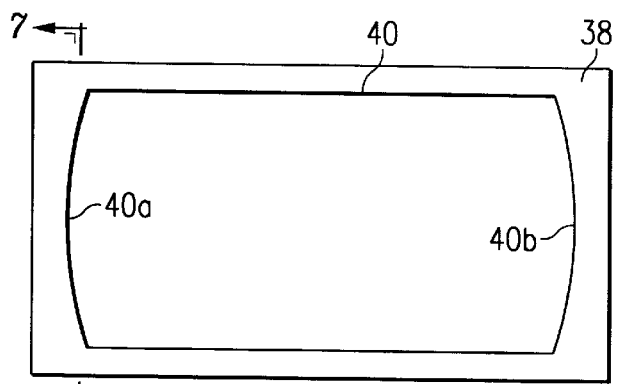
FIG. 6 is a top view of the carrier illustrated in FIG. 5.
Figure 8:
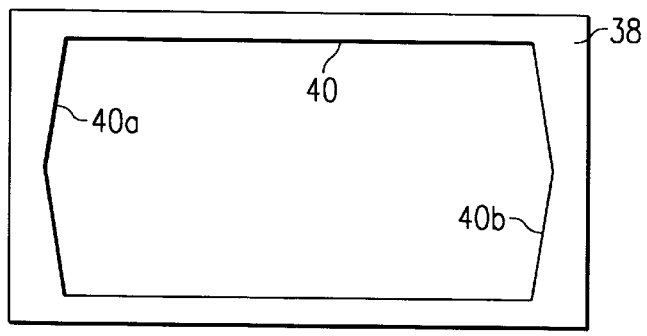
FIG. 8 is a top view illustrating a first alternate embodiment of a carrier according to the present disclosure.
Figure 9:
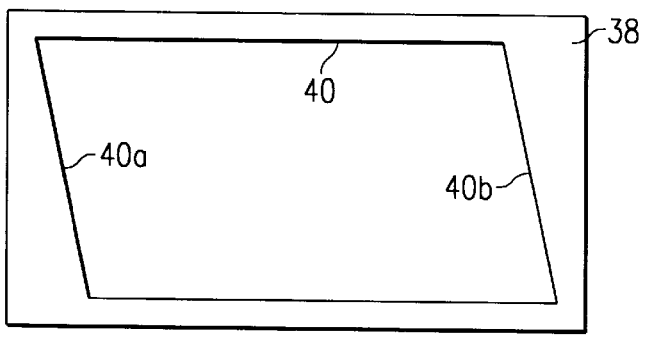
FIG. 9 is a top view illustrating a second first alternate embodiment of a carrier according to the present disclosure.

To minimize the potential for binding, a first and second edges 40a, 40b of the opening 40 are contoured. The first and second edges 40a, 40b may have a variety of shapes and configurations. When determining the configuration of the first and second edges 40a, 40b, a key objective is to establish point contact between the respective edges of the opening 40 and bay 32. Depending on the specific configuration of the opening 40 and the bay 32, there may be more than one point of contact. However, line contact will not be exhibited. Examples of suitable edge configurations include arcuate profiles as illustrated in FIG. 6, a generally "V" shaped contour as illustrated in FIG. 8, or a diagonal edge configuration as illustrated in FIG. 9.

By providing for point contact between the respective edges of the opening 40 and bay 32, a warped edge of the opening 40 becomes self-aligning to the adjacent edge 32a, 32b of the bay 32. As the carrier is inserted into or removed from the bay 32, any contact between a warped edge of the opening 40 and the adjacent edges 32a, 32b of the bay 32 will displace the warped edge of the carrier 34, allowing the carrier 34 to be inserted or removed without any adverse binding.

In operation, the embodiments disclosed herein provide an apparatus that is inserted and removed from a computer system. The apparatus includes a peripheral device for communicating data with the computer system. A carrier enables the peripheral device to be mounted to the chassis or enclosure of the computer system. The carrier includes a first wall having an opening formed through it. The edges of the opening are configured such that point contact is established if the edge of the opening contacts the adjacent edge of the chassis or enclosure. The point contact feature provides self-alignment between any contacting edges of the opening and the chassis or enclosure such that adverse binding is not exhibited.

As a result, one embodiment provides a carrier for removably mounting a peripheral device in a computer system. The carrier includes a plurality of walls forming a cavity for receiving the peripheral device. The cavity has a first end and a second end. A first one of the walls has an opening formed therein. The opening has a contoured first edge adjacent the first end of the cavity.

Another embodiment provides a carrier including a plurality of walls forming a cavity for receiving the peripheral device. The cavity has a first end and a second end. A first one of the walls has an opening formed therein. The opening has contoured edges adjacent the first and second ends of the cavity. A recessed portion is adjacent the opening in the first wall and the recessed portion extends at least partially between the first and second ends of the cavity.

In still another embodiment, a carrier includes a plurality of walls forming a cavity for receiving the peripheral device. The cavity has a first end and a second end. A first one of the walls has an opening formed therein. The opening has a first edge adjacent the first end of the cavity. The first edge is configured to be in substantially angled relation relative to a longitudinal axis of the cavity.

In still a further embodiment, a data communicating apparatus including a peripheral device having means for interconnecting a peripheral device to a computer system and for interpreting data communicated with the computer system. The peripheral device is mounted in a carrier. The carrier includes a plurality of walls forming a cavity for receiving the peripheral device. The cavity has a first end and a second end. A first one of the walls has an opening formed therein. The opening has contoured edges adjacent the first and second ends of the cavity. A recessed portion is formed adjacent the opening in the first wall and the recessed portion extends at least partially between the first and second ends of the cavity.

Yet a further embodiment provides a computer system including an enclosure having a bay formed therein for receiving a peripheral device. A microprocessor is mounted in the enclosure; an input is coupled to provide input to the microprocessor; a mass storage is coupled to the microprocessor; a display is coupled to the microprocessor by a video controller; a system memory is coupled to provide storage to facilitate execution of computer programs by the microprocessor; and a carrier for removably mounting the peripheral device in the bay. The carrier includes a plurality of walls forming a cavity for receiving the peripheral device. The cavity has a first end and a second end. A first one of the walls has an opening formed therein. The opening has contoured edges adjacent the first and second ends of the cavity. A recessed portion is adjacent the opening in the first wall and the recessed portion extends at least partially between the first and second ends of the cavity.

Yet still a further embodiment provides a method of making a carrier for mounting a peripheral device in a computer system. The method includes the steps of forming a plurality of walls; forming a cavity having first and second ends in a first one of the walls; forming an opening in a first wall one of the walls; contouring the first edge of the opening adjacent the first end of the cavity; and forming a recessed portion in the first wall adjacent the opening extending at least partially between the first and second ends of the cavity.

As it can be seen, embodiments presented herein provide several advantages. The apparatus may be inserted into the chassis of the computer system without an undue amount of force. The apparatus has a self-alignment feature to prevent binding between the carrier and the chassis or enclosure. The self-alignment feature allows the apparatus to be inserted and removed with a smooth action.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A peripheral device mounting apparatus comprising:
   an enclosed bay including a bay opening formed therein; and
   a carrier movable into and out of the bay via the bay opening, the carrier having a wall including a wall opening formed therein, the wall opening having a contoured edge surface which moves adjacent a bay edge surface of the bay opening, the contoured edge surface being oriented at an angle so as to be non-parallel relative to the bay edge surface and avoid binding of the carrier moving relative to the bay opening.

2. The apparatus of claim 1 wherein the contoured edge surface is arcuate.

3. The apparatus of claim 1 wherein the contoured edge surface is generally "V" shaped.

4. The apparatus of claim 1 further comprising a peripheral device mounted in the carrier.

5. A computer system, comprising:
   an enclosure having a bay formed therein for receiving a peripheral device;
   a microprocessor mounted in the enclosure;
   an input coupled to provide input to the microprocessor;
   a mass storage coupled to the microprocessor;
   a video controller coupled to the microprocessor;
   a system memory coupled to provide storage to facilitate execution of computer programs by the microprocessor;
   a bay opening; and
   a carrier movable into and out of the bay via the bay opening, the carrier having a wall including a wall opening formed therein, the wall opening having a contoured edge surface which moves adjacent a bay edge surface of the bay opening, the contoured edge surface being oriented at an angle so as to be non-parallel relative to the bay edge surface and avoid binding of the carrier moving relative to the bay opening.

6. The computer system of claim 5 wherein the contoured edge surface is arcuate.

7. The computer system of claim 5 wherein the contoured edge surface is generally "V" shaped.

8. The computer system of claim 5 further comprising a peripheral device mounted in the carrier.

9. A computer comprising:
   an enclosed bay including a bay opening formed therein; and
   a carrier movable into and out of the bay via the bay opening, the carrier having wall including a wall opening formed therein, the wall opening having a pair of opposed contoured edge surfaces which move adjacent a bay edge surface of the bay opening, the contoured edge surfaces being oriented at an angle so as to be non-parallel relative to the bay edge surface and avoid binding of the carrier moving relative to the bay opening.

10. The computer of claim 9 wherein each contoured edge surface is arcuate.

11. The computer of claim 9 wherein each contoured edge surface is generally "V" shaped.

12. The computer of claim 9 further comprising a peripheral device mounted in the carrier.

* * * * *